Patented Aug. 22, 1933

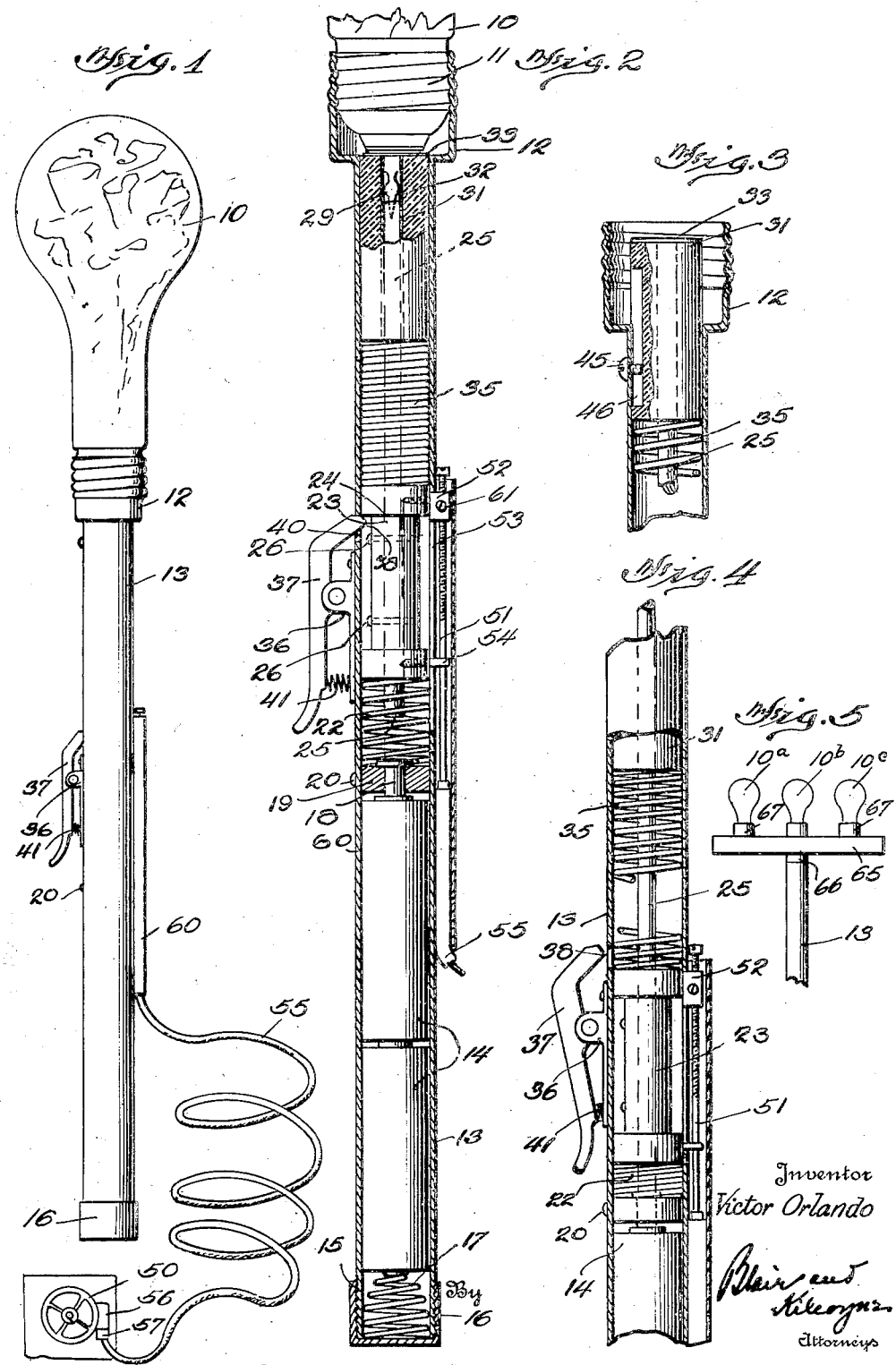

1,923,997

UNITED STATES PATENT OFFICE 1,923,997

PHOTOGRAPHIC APPARATUS

Victor Orlando, New York, N. Y., assignor to
Charles H. Fernald, New York, N. Y.

Application December 23, 1930
Serial No. 504,347

16 Claims. (Cl. 67—29)

This invention relates to photographic apparatus and more particularly to aparatus for timing properly the flash of an electrical flash lamp and the operation of a camera shutter, all as utilized in flashlight photography.

An object of my invention is the provision of apparatus for energizing an electrical flash lamp and for actuating the shutter of a camera in properly timed relation. A further object is the provision of an improved mounting for electrical flash lamps and of apparatus for completing an electrical circuit therethrough. A further object is the provision of an improved mounting for electrical flash lamps by which the lamp may be readily and advantageously handled, positioned and operated by the photographer. A further object is the provision of a novel combination of elements including an arrangement for flashing or illuminating an electrical flash lamp and simultaneouly with the flash thereof actuating the camera shutter whereby the exposure may be taken at the instant of maximum illumination.

Other objects will be in part obvious and in part hereinafter pointed out in connection with the following analysis of this invention, wherein is illustrated one of the various possible embodiments of the present invention, together with certain modifications in detail.

In the drawing—

Fig. 1 is an elevation of the complete assembly in accordance with my invention;

Fig. 2 is an enlarged vertical section through the apparatus of Fig. 1;

Fig. 3 is a detail of one end of the flash lamp socket and associated support prior to assembly of the flash lamp therewith;

Fig. 4 is a further detail illustrating the relation of certain parts in circuit closing position, whereby to complete an electrical circuit through the flash lamp;

Fig. 5 illustrates a modification utilizing a plurality of lamps for illuminating large areas.

In the drawing, the reference character 10 designates an electrical flash lamp provided with a usual threaded metallic base portion 11, which may be threaded into a socket 12 disposed at one end of a tubular handle 13 of conducting material. Contained within said handle, at its other end portion, are dry batteries 14 which constitute a source of electrical energy, the end of the handle 13 being threaded as at 15. A closure cap 16 is adapted to be threaded thereto and, as will be apparent from Fig. 2, forms a closure for the battery containing end of the handle 13.

The batteries 14, which are arranged in tandem where more than one cell is utilized, are in electrical engagement and are resiliently positioned in the handle by a coil spring 17 of conducting material operative between the closure cup 16 and the lowermost cell, and urging the terminal of the upper battery into engagement with a fixed metallic plug or anvil 18 carried by a collar 19 of non-conducting material. The collar 19 is fixed in the handle 13 by a set screw or equivalent means 20. A relatively light spring 22 is disposed within handle 13 and operative between the collar 19 and one end of a reciprocable plunger block designated at 23, the said block being provided with an undercut shoulder 24, the purpose of which will be hereinafter apparent. The plunger block 23, which is preferably of a non-conducting material such as fiber, is axially bored for the reception of a plunger rod 25 of conducting material, the block and rod 25 being maintained in fixed relation with respect to each other as by pins or equivalent securing means 26. The plunger rod 25 extends in axial alignment with the plug 18 and may engage the same in its lowermost position. At relatively its upper end, the plunger rod 25 extends into a fiber bushing 31 axially bored for the reception of a fixed sleeve 32 of conducting material, to which is secured at its top, to extend over the end of the bushing 31, a conducting metal disc 33. In order to secure proper electrical contact, the plunger rod 25 may be provided with leaf springs 29 of conducting material, which have a resilient, sliding contact with the conducting sleeve 32. Thus current may pass, under certain conditions, through the rod 25, springs 29, sleeve 32, and disc 33. Between the bushing 31 and plunger block 23 is arranged a relatively heavy spring 35, constituting an energizing means operative to actuate the plunger block 23 and rod 25 from a retracted or circuit open position into engagement with the anvil 18 to a circuit closing position.

Carried outside of the handle 13 is a yoke 36 forming a fulcrum for a pivoted trigger 37 having a nose portion 38 which may extend through an aperture 40 of the handle to engage shoulder 24 of the plunger block 23. A spring 41 between the handle 13 and the free end of the trigger 37 functions to urge the nose 38 of the trigger into engagement with said shoulder 24.

Such parts as are above described constitute the mounting for the flash lamp 10 and the means for completing an electrical circuit therethrough, and the operation and relation of these parts is briefly as follows. The lamp 10 is screwed into socket 12, the trigger 37 by its engagement with shoulder 24 of the plunger block 23 holding the block and plunger rod 25 in retracted or open circuit relation. Continued threading of the lamp into socket 12 forces relatively downwardly the fiber brushing 31 to compress the heavy spring 35, the lamp terminal contacting the conducting disc 33 whereby the lamp is in conductive relation to the sleeve 32 and plunger rod 25.

When it is desired to flash the lamp, the operator depresses the free end of trigger 37, which moves the nose 38 thereof from engagement with the shoulder 24 of the plunger block, the spring 35 thereupon actuating relatively downwardly the plunger rod 25, which functions as a switch, into engagement with the plug or anvil 18, the conductive relation of the plunger 25 and lamp 10 being maintained through the conducting sleeve 32, the actuation of the block 23 also functioning to compress the light spring 22. The electrical circuit from the battery 14 is thus completed as follows: the central terminal of the battery, plug 18, plunger rod 25, sleeve 32, disc 33, through lamp 10, out through socket 12, handle 13, cap 16, spring 17, and to the bottom terminal of the lower dry cell 14.

Upon unthreading of the lamp 10 from socket 12, the combined propulsion forces of springs 22 and 35 force upwardly the block 23, spring 35, and bushing 31, to a position enabling trigger nose 38 to again engage the shoulder 24 of the block whereby to hold the plunger rod 25 in retracted or circuit opening relation, and ready for the next insertion of a lamp 10 into the socket 12. Ejection of the bushing 31 may be prevented by a set screw 45 or equivalent means engaging in an undercut slot 46 arranged in the bushing, thus to limit its axial movement.

In order to actuate the shutter, diagrammatically illustrated at 50 (Fig. 1), in properly timed relation with the flash of lamp 10, I provide a connection between the reciprocating plunger block 23 and said shutter. This connection constitutes a metal rod 51 disposed adjacent the plunger block 23 and exterior of the handle 13, and threaded at its end into a block 52 which is fixed to the plunger block 23 and movable with respect to the handle 13 through a slot 53 therein. The rod 51 is further guided in an eye 54 threaded in said block 23 and thereafter extends through flexible tubing 55, the end of the rod having a connection with a shutter operating mechanism generally indicated at 56, and being provided with a threaded nipple 57 whereby it may be screwed to the shutter mechanism for efficient operation.

The shutter actuating rod 51 adjacent its connection to handle 13 operates in a housing 60 which is secured to handle 13, the housing at its lowermost end having an opening through which rod 51 and flexible tubing 55 therefor may pass to the shutter actuating mechanism.

Thus it will be seen that as the plunger block 23 is moved upon actuating of trigger 37 to close the circuit through switch rod 25, the metal rod 51 is likewise moved in an axial direction to actuate the shutter mechanism 56 in properly timed relation to the flash of the lamp 10. Consequently, the actuation of the shutter is responsive to the completion of the circuit through the flash lamp. In order to definitely and synchronously time the shutter actuation with the instant of flash, rod 51 may be turned in the block 52, whereby to be moved axially of the plunger block 23, thus to advance or retard the instant of shutter actuation relative to the instant of flash of lamp 10. A set screw 61 operating in block 52 may be provided to hold permanent the rod 51 in properly adjusted position.

Where a large area is to be photographed, it is desirable to flash a number of flash lamps simultaneously to obtain sufficient illumination. In Fig. 5, I have illustrated such an arrangement comprising a cross-arm 65 provided on one side with a socket 66 and on another side with a plurality of lamp sockets 67. Three lamps 10a, 10b, 10c, have been shown by way of illustration, and are connected in multiple. It will be understood that the lamp carrying arm 65 is threaded on to handle 13 in the manner previously described with relation to the single lamp 10, and the plurality of lamps are simultaneously flashed whereby a large area of illumination is obtained.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of the invention, and therefore such adaptations should and are intended to be comprehended within the meaning and range of equivalency of the following claims.

I claim:

1. In combination with a photographic camera having a shutter, an electrical flash lamp, a support therefor including a source of current and a normally open circuit between the source and the lamp, means to close the circuit including a member arranged for movement axially of said support, and means responsive to the actuation of said member to actuate the camera shutter.

2. In combination with a photographic camera having a shutter, an electrical flash lamp, a support therefor including a source of current and a normally open circuit between the source and the lamp, means to close the circuit including a member arranged for movement axially of the support and an actuator for said member being rendered operative upon proper association of the lamp with the support, and means responsive to the actuation of said member to actuate the camera shutter.

3. In combination with a photographic camera having a shutter, an electrical flash lamp, a support therefor including a source of current and a normally open circuit between the source and the lamp, means to close the circuit including a member arranged for movement axially of the support and an actuator for said member being rendered operative upon proper association of the lamp with the support, means for controlling actuation of said member, and means responsive to the actuation of said member to actuate the camera shutter in properly timed relation to the flash of the lamp.

4. In combination with a photographic camera having a shutter, an electrical flash lamp, a carrying handle therefor, a normally open electrical circuit including said lamp, means to close the circuit whereby to illuminate the lamp, said means including a member movable longitudinally within the handle, means responsive to the actuation of said member to actuate the camera shutter, and means to actuate the shutter in properly timed relation to the flash of the lamp.

5. In flashlight apparatus, the combination of an electrical flash lamp, a supporting member having a lamp socket at one end thereof in which the lamp is mounted, a source of current disposed adjacent the other end thereof, a normally open electrical circuit including said lamp, the supporting member, and the current source, a switch member arranged in the supporting member intermediate the socket member and the current source, and means adapted to be rendered actuable upon mounting of the lamp in the socket for actuating the switch member to circuit closing position.

6. In combination with a photographic camera having a shutter, an electrical flash lamp, a supporting member having a lamp socket at one end thereof in which the lamp is mounted, a source of current disposed adjacent the other end thereof, a normally open electrical circuit including said lamp, the supporting member, and the current source, a switch member arranged in the supporting member intermediate the socket member and the current source, means adapted to be rendered operable upon mounting of the lamp in the socket for actuating the switch member to circuit closing position, and means responsive to such actuation to actuate the camera shutter.

7. In flashlight apparatus, the combination of a tubular member having a lamp socket at one end, an electrical flash lamp disposed in the socket, a source of electrical energy contained in said member adjacent the other end thereof, a normally open electrical circuit including said lamp, the member, and said current source, a switch member arranged in axial alignment with respect to the tubular member, and a spring adapted to be energized by the act of disposing the lamp in the socket for actuating the switch member to circuit closing position whereby to complete a circuit through the flash lamp.

8. In combination with a photographic camera having a shutter, a tubular member having a lamp socket at one end, an electrical flash lamp disposed in the socket, a source of electrical energy contained in said member adjacent the other end thereof, a normally open electrical circuit including the lamp, the member, and said current source, a switch member arranged in axial alignment with respect to the tubular member, means for actuating the switch member to circuit closing position whereby to complete a circuit through the flash lamp, and means responsive to such actuation to actuate the camera shutter.

9. In flashlight apparatus, the combination of a tubular member having a lamp socket at one end thereof, an electrical flash lamp mounted in the socket, a source of electrical energy contained in the tubular member at the other end thereof, an electrical circuit including the tubular member, lamp, and source of energy, a switch member contained in the tubular member and reciprocable in the direction of the axis thereof, spring means adapted to be energized by the act of mounting the lamp in the socket for actuating said switch member to circuit closing relation, and manual means operative to cause actuation of the switch actuating means.

10. In combination with a photographic camera having a shutter, a tubular member having a lamp socket at one end thereof, an electrical flash lamp mounted in the socket, a source of electrical energy contained in the tubular member at the other end thereof, an electrical circuit including the tubular member, lamp, and source of energy, a switch member contained in the tubular member and disposed intermediate the socket and the energy source, means adapted to be rendered actuable by the act of mounting the lamp in the socket for actuating said switch member to circuit closing relation, and manual means operative to cause actuation of the switch member and the camera shutter.

11. In flash light apparatus, the combination of a tubular member, a lamp socket disposed adjacent one end thereof, an electrical flash lamp mounted in said socket, a source of electrical energy in said member adjacent the other end thereof, a normally retracted switch member movable in the direction of the axis of the tubular member, means adapted to be rendered actuable by the act of mounting the lamp in the socket to actuate the switch member from such retracted relation whereby to complete a circuit through the lamp, and manual means for actuating said last-named means.

12. In combination with a photographic camera having a shutter, a tubular member, a lamp socket disposed adjacent one end thereof, an electrical flash lamp mounted in said socket, a source of electrical energy in said member adjacent the other end thereof, a normally retracted switch member, means adapted to be rendered actuable by the act of mounting the lamp in the socket to actuate the switch member from such retracted relation longitudinally of said tubular member whereby to complete a circuit through the lamp, manual means for actuating said last-named means, and means responsive to the actuation of said switch member to actuate the camera shutter.

13. In flash light apparatus, the combination of an elongated hollow member, a lamp socket disposed adjacent one end thereof, an electrical flash lamp mounted in said socket, a battery cell in said member adjacent the other end thereof, a fixed anvil in said member, means maintaining an electrical connection between the cell and the anvil, a reciprocable switch member, and means to actuate the switch member into engagement with said anvil, whereby to complete a circuit through the lamp.

14. In combination with a photographic camera having a shutter, an elongated hollow member, a lamp socket disposed adjacent one end thereof, an electrical flash lamp mounted in said socket, a battery cell in said member adjacent the other end thereof, a fixed anvil in said member, means maintaining an electrical connection between the cell and the anvil, a reciprocable switch member, means to actuate the switch member into engagement with said anvil, whereby to complete a circuit through the lamp, and means responsive to the actuation of the switch member to actuate the camera shutter.

15. In combination with a photographic camera having a shutter, an electrical flash lamp, a handle therefor including a normally open electrical circuit and a plunger member reciprocable therein and operative upon actuation to complete the circuit, a member mounted for reciprocable movement and connected at one end to said plunger member and at its other end to said shutter, and means to adjust said members relative to each other whereby to time properly the flash of the lamp and the actuation of the shutter.

16. In combination with a photographic camera having a shutter, an electrical flash lamp, a handle therefor including a normally open electrical circuit and a plunger reciprocable axially of said handle and operative upon actuation to complete the circuit, a member connected at one end to said plunger so as to be movable therewith and at its other end to said shutter, and means to adjust said member axially of the plunger, whereby to time properly the flash of the lamp and the actuation of the shutter.

VICTOR ORLANDO.